(12) United States Patent
Sakakibara et al.

(10) Patent No.: US 9,004,576 B2
(45) Date of Patent: Apr. 14, 2015

(54) VEHICLE FRONT STRUCTURE (71) Applicant: Toyota Jidosha Kabushiki Kaisha, Toyota-shi (JP)

(72) Inventors: Kosuke Sakakibara, Toyota (JP); Tomoyuki Kuriyama, Toyota (JP); Akihiro Tamaoki, Tajimi (JP); Kenjiro Yamada, Toyota (JP); Shintaro Kitakata, Nissin (JP); Yasuyuki Hihara, Toyota (JP); Yasutaka Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/483,491

(22) Filed: Sep. 11, 2014

(65) Prior Publication Data

US 2015/0069785 A1    Mar. 12, 2015

(30) Foreign Application Priority Data

Sep. 11, 2013 (JP) .................................. 2013-188473

(51) Int. Cl.
*B62D 7/00* (2006.01)
*B62D 25/08* (2006.01)

(52) U.S. Cl.
CPC .................................. *B62D 25/082* (2013.01)

(58) Field of Classification Search
USPC ............... 296/187.09, 187.1, 203.02, 193.09; 293/132, 133
See application file for complete search history.

(56) References Cited

U.S. PATENT DOCUMENTS

| 7,296,824 | B2 * | 11/2007 | Yasui et al. .................... 280/784 |
| 7,992,926 | B2 * | 8/2011 | Tamakoshi ............... 296/187.09 |
| 2004/0195862 | A1 * | 10/2004 | Saeki ....................... 296/187.09 |

FOREIGN PATENT DOCUMENTS

| JP | 4617681 | 1/2011 |
| JP | 4691964 | 6/2011 |
| JP | 2014-108755 | 6/2014 |

* cited by examiner

*Primary Examiner* — Joseph D Pape
(74) *Attorney, Agent, or Firm* — Oblon, McClelland, Maier & Neustadt, L.L.P.

(57) ABSTRACT

When a collision load is transmitted to a gusset, the load is transmitted to an inner side in a vehicle width direction via an inclined wall. Accordingly, moment that causes a front side member to be projected and bent inward to the inner side in the vehicle width direction with an intersection being a starting point acts on the front side member. Then, the front side member, which has been projected and bent inward, collides with a power unit that is disposed in an engine compartment from an outer side in the vehicle width direction. Accordingly, a lateral force to the inner side in the vehicle width direction can be obtained for a vehicle.

5 Claims, 5 Drawing Sheets

VEHICLE FRONT STRUCTURE

INCORPORATION BY REFERENCE

The disclosure of Japanese Patent Application No. 2013-188473 filed on Sep. 11, 2013 including the specification, drawings and abstract is incorporated herein by reference in its entirety.

BACKGROUND OF THE INVENTION

1. Field of the Invention

The present invention relates to a vehicle front structure.

2. Description of Related Art

In a vehicle front structure that is disclosed in Japanese Patent Publication No. 4691964 below, a triangular outer member (a gusset) is disposed in a front part in a vehicle front-rear direction of a front side member on an outer side in a vehicle width direction. Then, a technique is disclosed in which the outer member and the front side member are arranged such that front ends thereof match each other in the vehicle front-rear direction, and in which a plate-shaped tension member is fixed to the front end of the outer member and the front end of the front side member. In this related art, during a head-on collision (hereinafter referred to as a "small overlap collision") in a mode that a load is applied to an outer side in the vehicle width direction of the front side member, a collision load can be transmitted from the outer member to the front side member via the tension member (a bracket).

In addition, in a vehicle front structure that is disclosed in Japanese Patent Publication No. 4617681 below, a connection member is provided in a front part in the vehicle front-rear direction of an apron reinforcement (an apron upper member). Then, a technique is disclosed in which this connection member and the front side member are arranged such that front ends thereof match each other in the vehicle front-rear direction, and in which a plate-shaped surface is fixed to the front end of the connection member and the front end of the apron reinforcement. In this related art, the collision load can be dispersed to the apron reinforcement and the front side member via the surface during the small overlap collision.

In a case of the head-on collision such as the small overlap collision, a vehicle can move away from a collision body by generating a lateral force to an inner side in the vehicle width direction in the vehicle. However, in a vehicle front structure according to the above related art, it is configured to transmit and disperse the collision load to rearward in the vehicle front-rear direction. Thus, there is room for improvement in a point that the lateral force to the inner side in the vehicle width direction is effectively generated in the vehicle.

SUMMARY OF THE INVENTION

The present invention provides a vehicle front structure that can effectively generate a lateral force to an inner side in a vehicle width direction in a vehicle during a head-on collision such as a small overlap collision.

A vehicle front structure according to one aspect of the present invention includes: a front side member that extends along a vehicle front-rear direction; a bumper reinforcement that extends along the vehicle width direction, bumper reinforcement disposed forward in the vehicle front-rear direction with respect to the front side member; and a gusset that is disposed on an outer side in the vehicle width direction with respect to the front side member and the gusset disposed rearward in the vehicle front-rear direction with respect to the bumper reinforcement, and the gusset is separated from the bumper reinforcement. A front end of the gusset in the vehicle front-rear direction is arranged forward in the vehicle front-rear direction with respect to a front end of the front side member in the vehicle front-rear direction.

In the vehicle front structure, the gusset is disposed on the outer side of the front side member in the vehicle width direction and the gusset is disposed on the rear side of the bumper reinforcement in the vehicle front-rear direction, and the gusset is separated from the bumper reinforcement. The front end of this gusset in the vehicle front-rear direction is arranged forward in the vehicle front-rear direction with respect to the front end of the front side member in the vehicle front-rear direction. Accordingly, during the head-on collision (such as the small overlap collision or an oblique collision) that is a collision mode in which an overlapping amount in the vehicle width direction with a collision body is small, a collision load is concentrically applied to the gusset.

The gusset is disposed forward in the vehicle front-rear direction and the outer side in the vehicle width direction with respect to the front side member. Accordingly, when the collision load is applied to the gusset, moment that causes the front side member to be bent to the inner side in the vehicle width direction (so-called inward projection and bending) acts on the front side member. The front side member is projected and bent inward and abuts against a vehicle component (for example, a power unit or the like). Thus, a lateral force to the inner side in the vehicle width direction can be generated in the vehicle.

As described above, the vehicle front structure exhibits a superior effect that the lateral force to the inner side in the vehicle width direction can effectively be generated in the vehicle during the head-on collision such as the small overlap collision.

In the vehicle front structure, an inclined wall may be formed in a rear part of the gusset in the vehicle front-rear direction, and the inclined wall may be inclined toward the inner side in the vehicle width direction as the inclined wall extends rearward in the vehicle front-rear direction.

In the vehicle front structure, when the collision load is applied to the gusset, the load is transmitted to the front side member via the inclined wall that is formed in the rear part of the gusset in the vehicle front-rear direction. Accordingly, the front side member can be projected and bent inward with a rear end of the inclined wall being a starting point.

The vehicle front structure exhibits a superior effect that a mode of deformation of the front side member can be stabilized.

In the vehicle front structure, a bracket may be coupled to the front end of the front side member in the vehicle front-rear direction and the bracket may be coupled to the front end of the gusset in the vehicle front-rear direction, the bracket includes a first coupling section, a second coupling section, and a step section, and the first coupling section is coupled to the front end of the front side member in the vehicle front-rear direction, the second coupling section is arranged forward in the vehicle front-rear direction with respect to the first coupling section and the second coupling section is coupled to the front end of the gusset in the vehicle front-rear direction, and a step section connects the first coupling section and the second coupling section.

In the vehicle front structure, the bracket that is joined to the front end of the front side member in the vehicle front-rear direction and the front end of the gusset in the vehicle front-rear direction, is configured to include the first coupling section and the second coupling section. The second coupling section is arranged forward in the vehicle front-rear direction with respect to the first coupling section, the first coupling section is coupled to the front end of the front side member in the vehicle front-rear direction, and the second coupling section is coupled to the front end of the gusset in the vehicle front-rear direction. When the collision load is applied to the gusset via the second coupling section and the front side member is projected and bent inward via the gusset, a tensile force toward the outer side in the vehicle width direction acts on the bracket.

Compared to a case where the bracket is not provided, the vehicle front structure exhibits a superior effect that it is possible to promote the inward projection and bending of the front side member during the head-on collision such as the small overlap collision.

The vehicle front structure may include a connection member that extends from an apron member, the apron member extends along the vehicle front-rear direction, the connection member is disposed on the outer side in the vehicle width direction with respect to the front side member, and a front end of the connection member in the vehicle front-rear direction is arranged rearward in the vehicle front-rear direction with respect to the front end of the gusset in the vehicle front-rear direction, and front end of the connection member in the vehicle front-rear direction is coupled to the bracket.

In the vehicle front structure, the apron member extends to the outer side in the vehicle width direction with respect to the front side member, and the connection member extends from the apron member. This connection member is arranged on the rear side in the vehicle front-rear direction with respect to the front end of the gusset in the vehicle front-rear direction, and the connection member is coupled to the bracket. Thus, in a configuration that is provided with the connection member, the collision load is concentrically applied to the gusset during the head-on collision such as the small overlap collision.

The vehicle front structure exhibits a superior effect that a portion of the collision load that is applied to the gusset can be dispersed to the connection member via the bracket.

In the vehicle front structure, the connection member may be coupled to the front part side of the gusset in the vehicle front-rear direction, and may be able to move relative to the rear part side of the gusset in the vehicle front-rear direction.

In the vehicle front structure, the rear part side of the gusset in the vehicle front-rear direction can move relative to the connection member. Accordingly, when the gusset moves by following the inward projection and bending of the front side member, the connection member is prevented from restricting the movement of the gusset.

The vehicle front structure exhibits a superior effect that it is possible to promote the inward projection and bending of the front side member in comparison with a case where the movement of the gusset is restricted by the connection member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on a vehicle front structure 10 according to an embodiment of the present invention on the basis of FIG. 1 to FIG. 5A, B. It should be noted that an arrow FR, an arrow UP, an arrow LH that are appropriately depicted in the drawings respectively indicate a front direction in a vehicle front-rear direction, an upper direction in a vehicle up and down direction, and a left direction side (another side in a vehicle width direction) when facing the front direction. When a longitudinal direction, a up and down direction, and a right and left direction are used in the following description without any particular instruction, the longitudinal direction, the up and down direction, and the right and left direction respectively indicate front and rear in the vehicle front-rear direction, up and down in a vehicle up and down direction, and right and left in a traveling direction.

(Configuration of Vehicle Front Structure)

Figure 1:
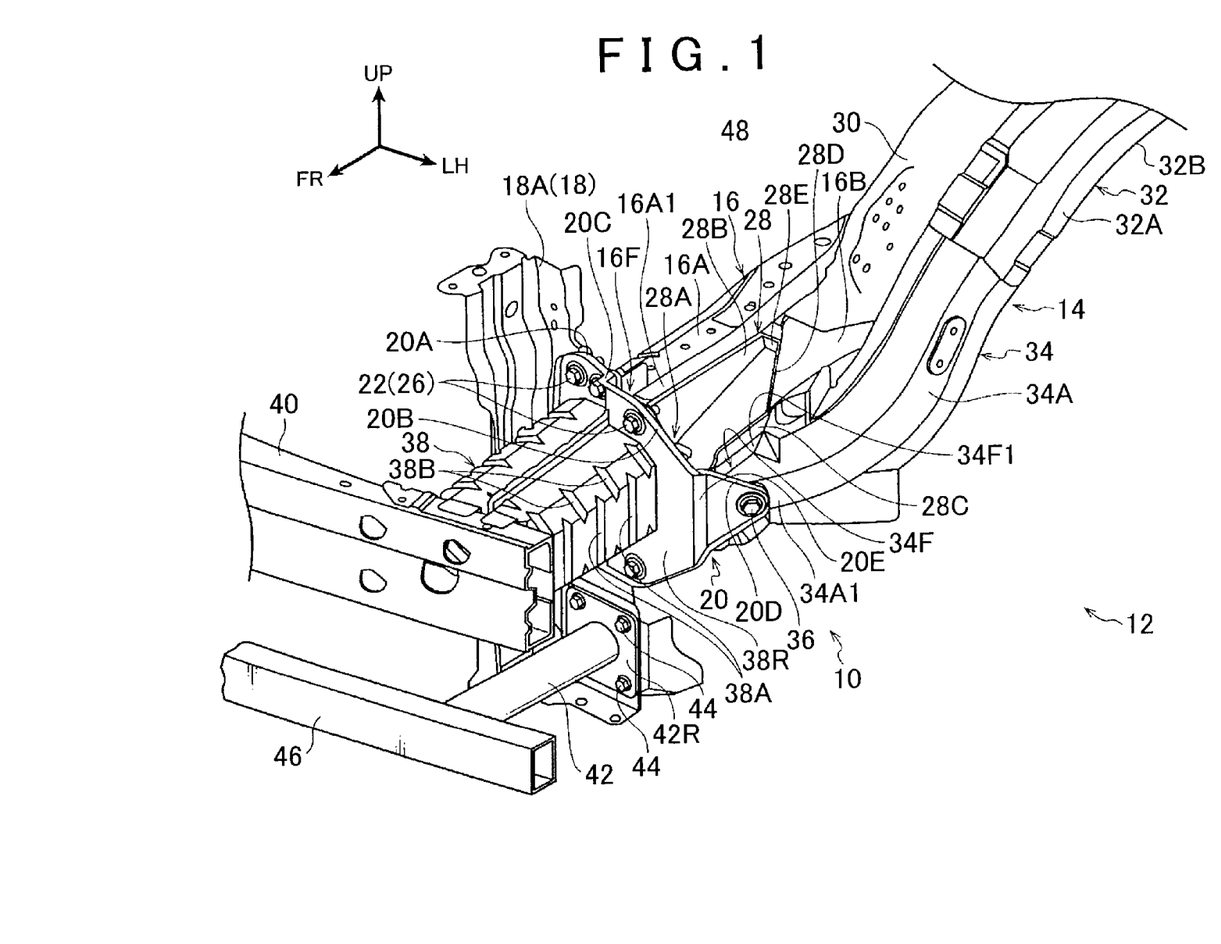
FIG. 1 is a perspective view in which a main section of a vehicle front structure according to this embodiment is enlarged.

As shown in FIG. 1, a vehicle body 14 of a vehicle (an automobile) 12 to which the vehicle front structure is applied includes a right and left pair of front side members 16. Here, a left side of the vehicle front structure 10 in the vehicle is shown. The front side members 16 are longitudinal in the vehicle front-rear direction and arranged in parallel and arranged apart in the vehicle width direction. A radiator support 18 is attached between front parts of the right and left front side members 16. Although not shown, the radiator support 18 is configured to include a portion in a rectangular frame shape in a front view since an upper member and a lower member that oppose each other in up and down direction are coupled at both ends in the vehicle width direction by a right and left pair of side members 18A.

The front side member 16 is, for example, configured to include a front side member inner 16A and a front side member outer 16B whose cross section that is orthogonal to the longitudinal direction is substantially hat shaped. Since flange sections 16A1 that are formed in these members (here, the flange section 16A1 of the front side member inner 16A is only shown) are coupled to each other by spot welding or the like, a cross section of the front side member 16 that is orthogonal to the longitudinal direction is in a closed cross-sectional shape.

Figure 2:
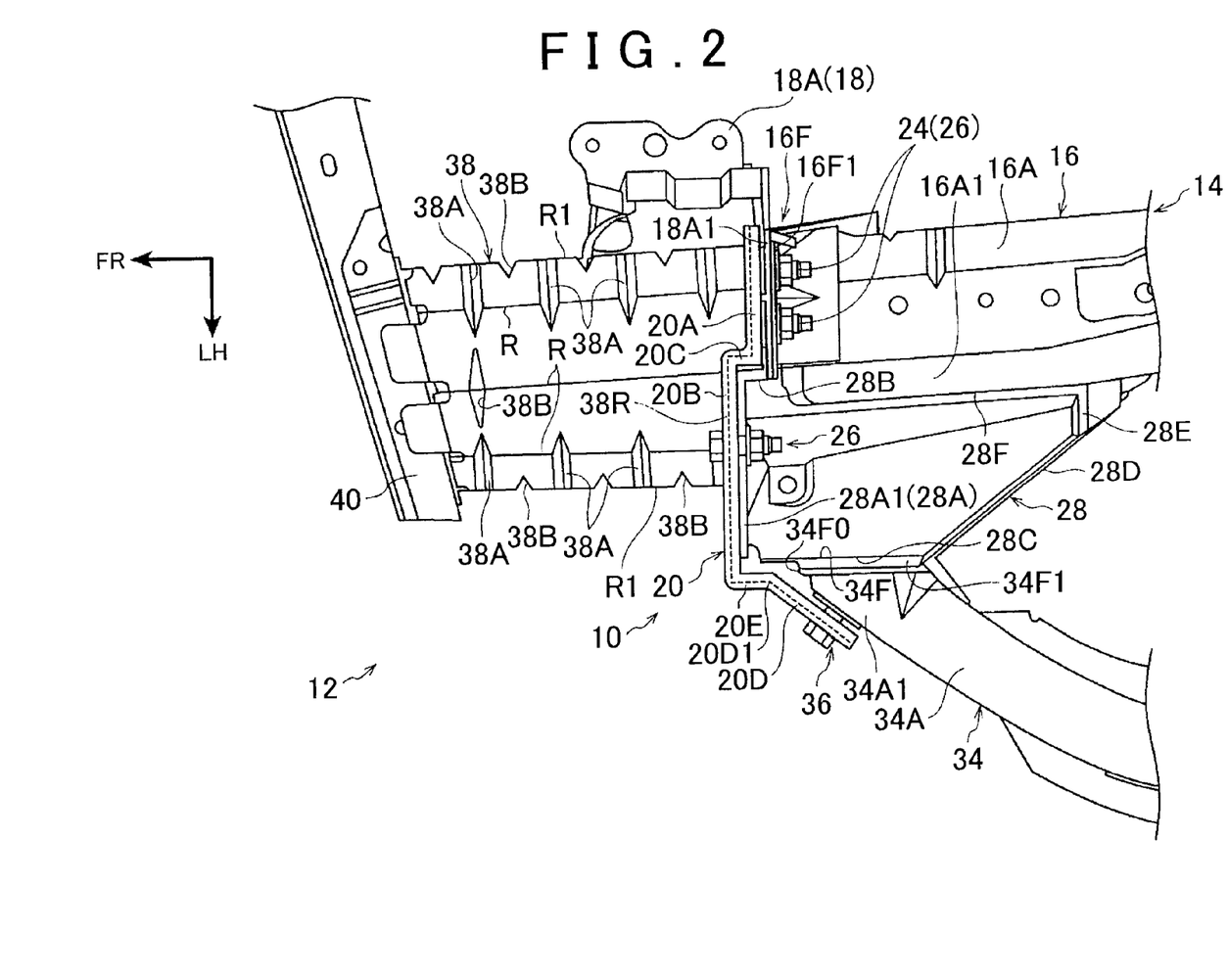
FIG. 2 is a plan view in which the main section of the vehicle front structure according to this embodiment is enlarged.

In addition, as shown in FIG. 2, a front flange 16F1 is provided at a front end 16F of the front side member 16, and a plate-shaped bracket 20 is fastened and coupled to the front flange 16F1 by a fastener 26 that includes a bolt 22 (see FIG. 1) and a weld nut 24. A flange section 18A1 of the side member 18A of the radiator support 18 is co-fastened in a state of being held between the bracket 20 and the front flange 16F1.

A gusset 28 having a polygonal shape in a plan view is provided on the outer side in the vehicle width direction with respect to a front part of the front side member 16. A front wall section 28A1 that is formed along the vehicle front-rear direction is provided at a front end 28A of the gusset 28, and the bracket 20 is fastened and coupled to the front wall section 28A1 by the fastener 26 (will be described below).

An inner side wall 28B (see FIG. 1) that is located on the inner side in the vehicle width direction and formed along the vehicle front-rear direction is projected from the front wall section 28A1 of the gusset 28, and an outer side wall 28C that is located on the outer side in the vehicle width direction and formed along the vehicle front-rear direction is projected from the front wall section 28A1 of the gusset 28. The inner side wall 28B extends longer than the outer side wall 28C. Then, an inclined wall 28D extends from a rear end of the outer side wall 28C. The inclined wall 28D is inclined to the inner side in the vehicle width direction as the inclined wall 28D extends rearward in the vehicle front-rear direction. The inclined wall 28D and the inner side wall 28B are connected by a rear wall section 28E that is formed along the vehicle width direction.

A flange section 28F that is projected to the inner side of the gusset 28 is continuously formed in the inner side wall 28B and the rear wall section 28E. This flange section 28F is coupled to the flange section 16A1 of the front side member 16 by the spot welding or the like. The gusset 28 is thereby integrated with the front side member 16.

As shown in FIG. 1, a fender apron 30 is provided on the outer side in the vehicle width direction with respect to the each front side member 16 (the one on the vehicle left side is only shown). A lower end of fender apron 30 on the inner side in the vehicle width direction with respect to the fender apron 30 is coupled to the front side member 16. Meanwhile, an upper end of the fender apron 30 on the outer side in the vehicle width direction with respect to the each fender apron 30 is coupled to an apron upper member 32 that is longitudinal in the vehicle front-rear direction.

In other words, the apron upper member 32 is arranged on the outer side in the vehicle width direction with respect to front side member 16, is arranged on the upper side of the front side member 16, and extends along the vehicle front-rear direction. This apron upper member 32 is configured to include an apron upper member outer 32A and an apron upper member inner (not shown) that have a substantially L-shaped cross section that is cut along an orthogonal direction to the longitudinal direction and that are divided in the vehicle up and down direction. Since these members are coupled to each other by the spot welding or the like, the apron upper member 32 has a closed cross-section that is orthogonal to the longitudinal direction.

The apron upper member 32 is coupled at a rear end to a front pillar, which is not shown. In addition, the apron upper member 32 is inclined to the lower side of the vehicle as the apron upper member 32 extends forward in the vehicle front-rear direction in a side view. A bottom wall 32B of the apron upper member 32 is curved in a substantially arcuate shape that is opened on the lower side. A front end of the apron upper member 32 is provided with an apron brace 34 as a connection member that is continuous with the apron upper member 32, is inclined to the lower side of the vehicle as apron brace 34 extends forward in the vehicle front-rear direction in the side view, and is longitudinal in the vehicle front-rear direction.

The apron brace 34 is configured to include an apron brace outer 34A and an apron brace inner (not shown) that have a substantially L-shaped cross section that is cut along an orthogonal direction to the longitudinal direction and that are divided in the vehicle up and down direction. Since these members are coupled to each other by the spot welding or the like, the apron brace 34 has a closed cross-section that is orthogonal to the longitudinal direction. Then, a rear end of the apron brace 34 is coupled to the front end of the apron upper member 32 by the spot welding or the like, and is thereby integrally connected to the apron upper member 32.

A front part of the apron brace 34 is formed to be curved such that a tip 34F of the apron brace 34 extends to the inner side in the vehicle width direction and the front part of the apron brace 34 is arranged along the vehicle front-rear direction. Then, a flange section 34F1 is formed at the tip 34F of the apron brace 34, and the apron brace 34 is coupled to a front part side of the outer side wall 28C of the gusset 28 by the spot welding or the like via the flange section 34F1. Meanwhile, the tip 34F of the apron brace 34 is not coupled to a rear part side of the outer side wall 28C of the gusset 28 and thus is free with respect to the outer side wall 28C of the gusset 28 (is in a state that the apron brace 34 and the gusset 28 can move relative to each other).

As described above, the bracket 20 is fastened and coupled to the front end 16F of the front side member 16 and the front wall section 28A1 of the gusset 28 that are shown in FIG. 2. Here, the front wall section 28A1 of the gusset 28 is arranged, so as to be located on the front side of the front end 16F of the front side member 16. Accordingly, a step section 20C is provided in the bracket 20 between a coupling section 20A as a first coupling section to which the front end 16F of the front side member 16 is coupled and a coupling section 20B as the second coupling section to which the front wall section 28A1 of the gusset 28 is coupled. The coupling section 20A and the coupling section 20B are offset in the vehicle front-rear direction by this step section 20C in the plan view, and the coupling section 20B is arranged on the front side of the coupling section 20A.

An inclined piece 20D extends from the coupling section 20B. The inclined piece 20D inclined to outer side in the vehicle width direction as the inclined piece 20 extends rearward in the vehicle front-rear direction. The inclined piece 20D is formed to be substantially orthogonal to the inclined wall 28D, which constitutes a portion of the gusset 28, in the plan view. A step section 20E that extends toward the rear side is provided between the coupling section 20B and the inclined piece 20D, and the step section 20E is set to have a slightly larger offset amount than the step section 20C. In other words, a front end 20D1 of the inclined piece 20D is arranged on the rear side of the coupling section 20A. In addition, the inclined piece 20D is fastened to a front end side 34A1 of the apron brace 34 via a fastener 36.

Figure 3:
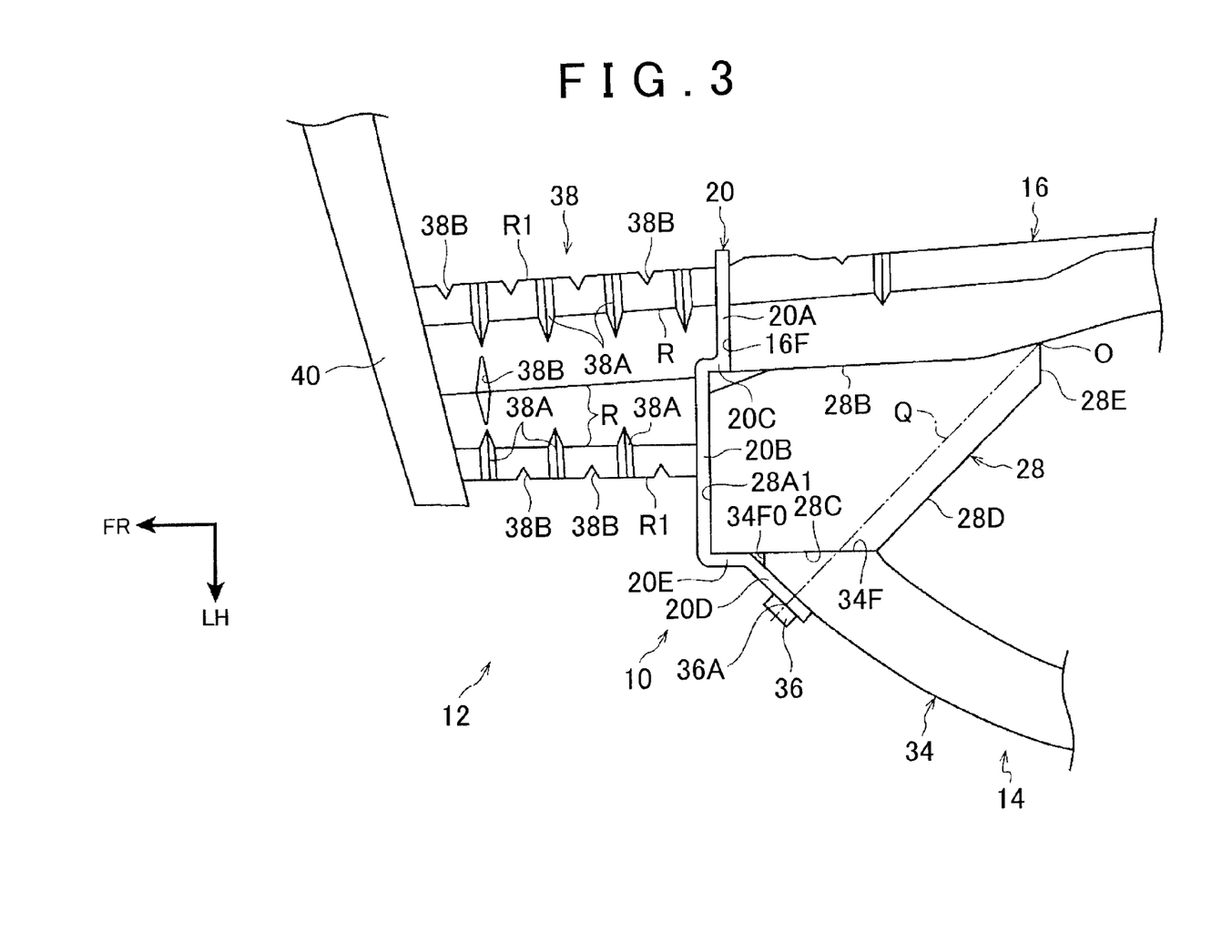
FIG. 3 is a schematic plan view in which the main section of the vehicle front structure according to this embodiment is enlarged.

In such a configuration described above, the front end 16F of the front side member 16, the front wall section 28A1 of the gusset 28, and the front end side 34A1 of the apron brace 34 are covered with the bracket 20. Then, as shown in FIG. 3, it is set such that a phantom line Q that connects a fastening position 36A of the fastener 36 and the intersection O between the rear wall section 28E of the gusset 28 and the front side member 16 is substantially parallel to the inclined wall 28D (a case where the inclined wall 28D is arranged on the phantom line Q is also included). In FIG. 3, for convenience of the description, the flange section 16A1 of the front side member 16 is not shown.

Meanwhile, as shown in FIG. 2, a crush box 38 is disposed at the bracket 20 and disposed on the front side of the front side member 16 and is disposed on the front side of the gusset 28. A rear flange 38R is provided at a rear end of the crush box 38 in an integral manner with the crush box 38. The rear flange 38R and the bracket 20 are fastened and coupled to the front flange 16F1 of the front side member 16 and the front wall section 28A1 of the gusset 28 in a state of being co-fastened by the fastener 26.

The crush box 38 that is attached to the bracket 20 has a substantially square tube shape that is longitudinal in the vehicle front-rear direction, and is formed with a plurality of ridge lines R along the vehicle front-rear direction. In the crush box 38, a plurality of concave portions 38A, 38B is formed across the ridge lines R along the orthogonal direction to the vehicle front-rear direction. The concave portion 38A and the concave portion 38B are arranged at a ridge line R1 that is located on the inner side in the vehicle width direction and at a ridge line R1 that is located the outer side in the vehicle width direction. The concave portion 38A and the concave portion 38B are alternately arranged at the ridge line R1 with a specified pitch being provided therebetween.

In addition, a bumper reinforcement 40 that is longitudinal in the vehicle width direction is coupled to a front end of the crush box 38. In other words, the bumper reinforcement 40 connects front end of the right crush box 38 with front end of the left crush box 38.

Meanwhile, as shown in FIG. 1, a flange 42R that is provided at a rear end of a pipe member 42 is fastened and coupled to a lower portion of the front flange 16F1 of the front side member 16 by a fastener 44, the pipe member 42 being disposed along the vehicle front-rear direction. A lower side bumper reinforcement 46 that is located below the bumper reinforcement 40 connects front end of the right pipe member 42 with front end of the left pipe member 42.

Figure 4A:
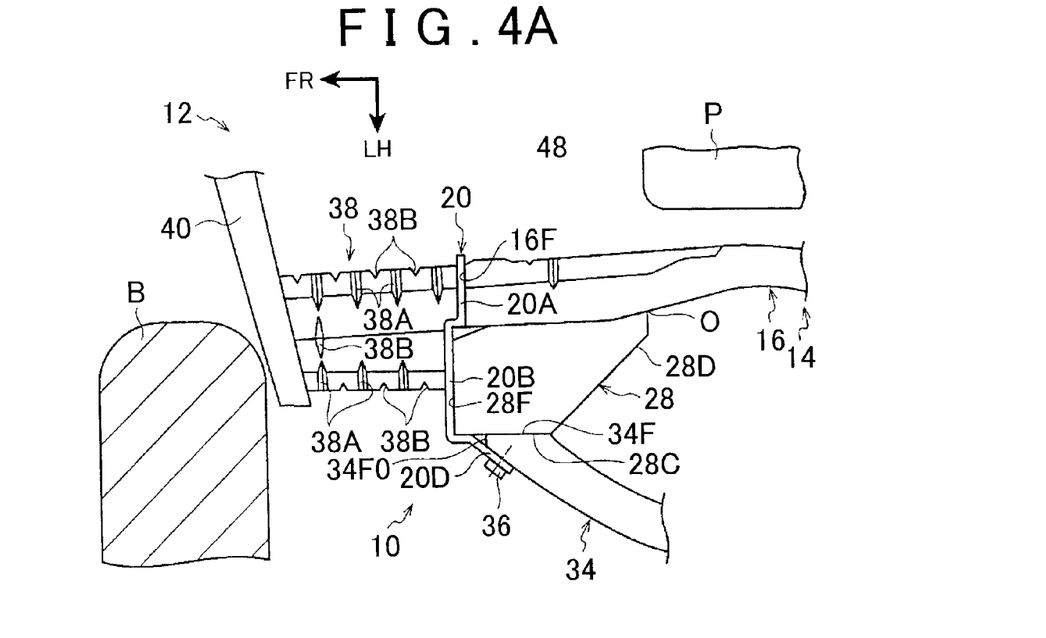
FIG. 4A is a schematic plan view that of a state immediately before a small overlap collision with the vehicle front structure according to this embodiment.

In addition, as shown in FIG. 4A, in an engine compartment 48, a power unit P that is a drive source of the vehicle 12 is arranged between the right and left front side members 16. The power unit P is directly or indirectly supported by components of the vehicle body 14 such as the right and left front side members 16 and a suspension member (not shown).

(Operation and Effects of Vehicle Front Structure)

Next, an operation and effects of this embodiment will be described. The following description will be made on an operation in a case where a mode of a collision occurs in which a collision body mainly collides with the left side as one side in the vehicle width direction of the vehicle 12, to which the vehicle front structure 10 configured as above is applied. As such a mode of the collision, the small overlap collision or an oblique collision can be raised.

Here, of a head-on collision of the vehicle, a collision with the front side member as a vehicle body frame to the outer side in the vehicle width direction corresponds to the small overlap collision, for example.

Figure 4B:
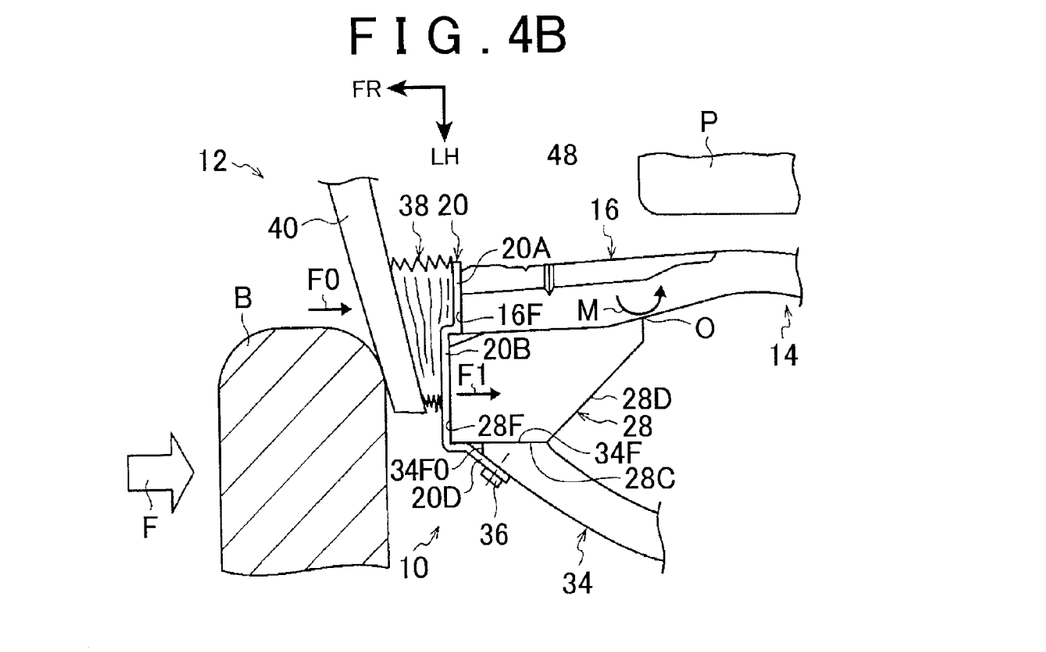
FIG. 4B is a schematic plan view of a state during the small overlap collision with the vehicle front structure according to this embodiment.

When the collision of such a mode (the small overlap collision in an illustrative example in FIG. 4A) occurs, as shown in FIGS. 4A, B, first, a collision load (F) that is directed to the rearward in the vehicle front-rear direction is applied from a barrier B as a collision body to the bumper reinforcement 40 to the outer side of the bumper reinforcement 40 in the vehicle width direction and the outer side of the front side member 16 in the vehicle width direction. As shown in FIG. 4B, when a collision load (F0) is transmitted to the crush box 38 by the bumper reinforcement 40, the crush box 38 is then compressed in the longitudinal direction.

As shown in FIG. 2, the crush box 38 is formed with the plurality of concave portions 38A, 38B along the orthogonal direction to the vehicle front-rear direction, and concave portions 38A, 38B crosses the ridge lines R, R1 which are formed along the vehicle front-rear direction. Thus, as shown in FIG. 4B, the crush box 38 is compressed in a state that no uncrushed portion is remained, and another portion of collision energy that is applied to the vehicle 12 is absorbed thereby in an initial period of the collision.

It is assumed that, as shown in FIG. 4B, the collision load (F) that is directed to the rearward in the vehicle front-rear direction is applied from the barrier B to the outer side of the lower side bumper reinforcement 46 in the vehicle width direction, the lower side bumper reinforcement 46 being located below the bumper reinforcement 40 as shown in FIG. 1. Then, the pipe member 42 is compressed in the vehicle front-rear direction by the lower side bumper reinforcement 46, and another portion of the collision energy that is applied to the vehicle 12 is absorbed thereby.

Here, as shown in FIG. 2, in the bracket 20 to which the rear flange 38R of the crush box 38 is fastened, the coupling section 20B, the coupling section 20A, and the inclined piece 20D are arranged in this order of 20B, 20A, 20D from forward in the vehicle front-rear direction to rearward in the vehicle front-rear direction. In other words, the front wall section 28A1 of the gusset 28, the front end 16F of the front side member 16, a front end 34F0 at the tip 34F of the apron brace 34 are arranged in this order of 28A1, 16F, 34F0 from forward in the vehicle front-rear direction to rearward in the vehicle front-rear direction.

Thus, as shown in FIG. 4B, when the collision load (F0) is transmitted to the crush box 38, a collision load (F1) is transmitted to the gusset 28 via the coupling section 20B of the bracket 20. The gusset 28 is disposed forward in the vehicle front-rear direction with respect to the front side member 16 and the outer side in the vehicle width direction with respect to the front side member 16. Accordingly, when the collision load (F1) is applied to the gusset 28, moment M that causes the front side member 16 to be bent to the inner side in the vehicle width direction (so-called inward projection and bending) acts on the front side member 16. Then, a portion of the energy during the collision is absorbed since the front side member 16 is projected and bent inward to the inner side in the vehicle width direction.

Figure 5A:
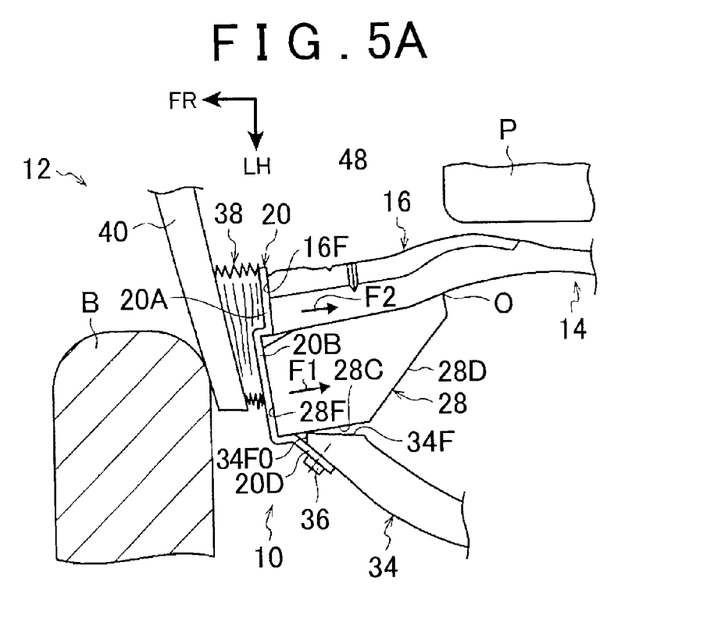
FIG. 5A is a schematic plan view of an operation at a different time point during the small overlap collision with the vehicle front structure according to this embodiment.
Figure 5B:
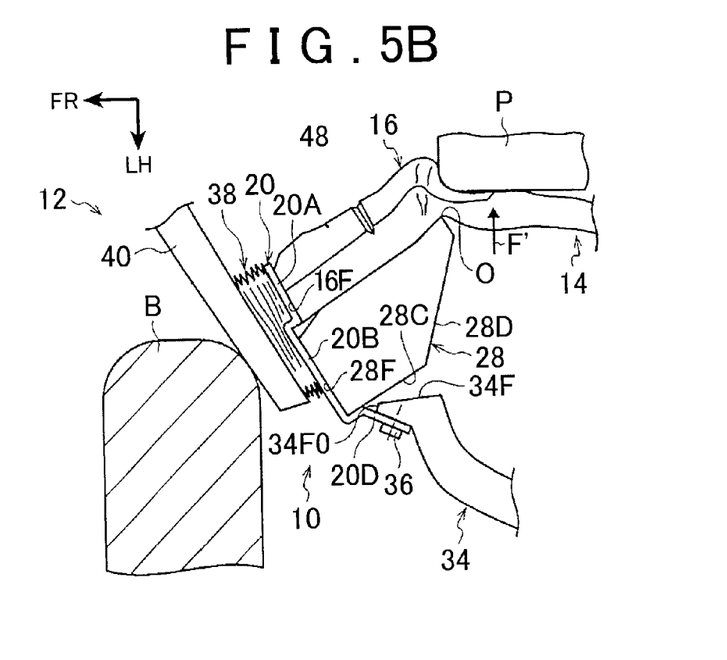
FIG. 5B is a schematic plan view of an operation at another different time point during the small overlap collision with the vehicle front structure according to this embodiment.

Here, the inclined wall 28D extends from the rear end of the outer side wall 28C in the gusset 28. The inclined wall 28D inclined to the inner side of the vehicle width direction as the inclined wall 28D extends rearward in the vehicle front-rear direction Accordingly, when the collision load (F1) is transmitted to the gusset 28, the load is transmitted to the inner side in the vehicle width direction via the inclined wall 28D. In other words, the concentrated load acts on the rear end of the inclined wall 28D (the intersection O between the rear wall section 28E and the front side member 16 in the gusset 28). Thus, as shown in FIGS. 5A, B, the front side member 16 can effectively be projected and bent inward to the inner side in the vehicle width direction with the intersection O being a starting point. Just as described, since the front side member 16 is deformed at an aimed position to the inner side in the vehicle width direction by the gusset 28, a mode of deformation thereof can be stabilized.

Furthermore, as shown in FIG. 5B, since the front side member 16, which has been projected and bent inward, collides with the power unit P, which is disposed in the engine compartment 48, from the outer side in the vehicle width direction, a lateral force (F') to the inner side in the vehicle width direction can be obtained for the vehicle 12. That is, it is possible to move the vehicle 12 to the inner side in the vehicle width direction and thereby separate the vehicle 12 from the barrier B. Accordingly, it is possible to suppress deformation of the vehicle body that is caused by the small overlap collision.

As described above, the collision load (F1) that is directed to the rear side is transmitted in the gusset 28 shown in FIG.

4B, and the front side member 16 is projected and bent inward by the moment M. During this process, as shown in FIG. 5A, a collision load (F2) is transmitted to the front side member 16 via the coupling section 20A of the bracket 20. This causes buckling deformation of a front end side of the front side member 16. Thus, it is possible to further promote the deformation of the front side member 16, which has been projected and bent inward, to the inner side in the vehicle width direction.

In other words, in the above configuration, the collision load (F1) is transmitted to the gusset 28, and the collision load (F2) is transmitted to the front side member 16. Accordingly, the collision load (F2) is transmitted to the front side member 16 in a state that the starting point (the intersection O) of the inward projection and bending with respect to the front side member 16 is obtained via the gusset 28. Thus, it is possible to stabilize the mode of deformation of the front side member 16 and to promote the inward projection and bending of the front side member 16.

In this embodiment, the coupling section 20A of the bracket 20 and the coupling section 20B of the bracket 20 are respectively fastened and coupled to the front end 16F of the front side member 16 and the front wall section 28A1 of the gusset 28. Accordingly, when the collision load is applied to the gusset 28 via the coupling section 20B of the bracket 20, and the front side member 16 is projected and bent inward via the gusset 28, a tensile force that is directed to the outer side in the vehicle width direction acts on the bracket 20. Thus, compared to a case where the bracket 20 is not provided, it is possible to promote the inward projection and bending of the front side member 16.

Here, the front end 34F0 side at the tip 34F of the apron brace 34 is coupled to the front part side of the outer side wall 28C of the gusset 28 by the spot welding or the like. Accordingly, as shown in FIG. 4B, when the collision load (F1) is transmitted from the front side to the gusset 28, the collision load can be dispersed by the gusset 28 and the apron brace 34.

Meanwhile, the tip 34F of the apron brace 34 is not coupled to the rear part side of the outer side wall 28C of the gusset 28 and thus is free therefrom. It is assumed here that the collision load (F1) is applied from the front side to the gusset 28. Then, as described above, the moment M that is directed to the inner side in the vehicle width direction is applied to the front side member 16 by the gusset 28. Consequently, as shown in FIGS. 5A, B, the front side member 16 is projected and bent inward to the inner side in the vehicle width direction.

At this time, although not shown, in a case of a comparative example in which the tip 34F of the apron brace 34 is firmly coupled to an entire region along the vehicle front-rear direction of the gusset 28, for example, movement of the gusset 28 is restricted by the apron brace 34, and thus the deformation of the front side member 16 may be suppressed by the gusset 28.

Considering the above, in this embodiment, as shown in FIGS. 5A, B, the tip 34F of the apron brace 34 can move with respect to the rear part side of the gusset 28 in the vehicle front-rear direction, and thus the movement of the gusset 28 is not restricted by the apron brace 34. Accordingly, compared to the case where the movement of the gusset 28 is restricted by the apron brace 34, it is possible to further promote the inward projection and bending of the front side member 16.

In addition, in this embodiment, as shown in FIG. 2, the front end 16F of the front side member 16, the front wall section 28A1 of the gusset 28, and the front end side 34A1 of the apron brace 34 is covered with the bracket 20. Then, as shown in FIG. 3, it is set such that the phantom line Q that connects the fastener 36 and the intersection O between the rear wall section 28E in the gusset 28 and the front side member 16 is substantially parallel to the inclined wall 28D. Accordingly, when the collision load is transmitted from the gusset 28 to the front side member 16, the load is effectively transmitted to the intersection O via the fastener 36.

SUPPLEMENTARY DESCRIPTION OF EMBODIMENT

In this embodiment, as shown in FIG. 2, the bracket 20 is attached to the front wall section 28A1 of the gusset 28 and the front end 16F of the front side member 16. However, the configuration in which the front wall section 28A1 of the gusset 28 is arranged on the front side of the front end 16F of the front side member 16 only needs to be adopted. Thus, the bracket 20 is not essential.

In addition, in the case where the bracket 20 is attached to the front wall section 28A1 of the gusset 28 and the front end 16F of the front side member 16, the coupling section 20B only needs to be arranged on the front side of the coupling section 20A and the inclined piece 20D. Thus, for example, the inclined piece 20D and the coupling section 20A may be formed in a substantially same position in the vehicle front-rear direction.

In this embodiment, the example in which the apron brace 34 is integrally connected to the apron upper member 32 (see FIG. 1) is described. However, a configuration in which the apron upper member 32 and the apron brace 34 are integrally formed may be adopted.

In this embodiment, the apron brace 34 is not coupled to the rear part side of the outer side wall 28C of the gusset 28 and thus is free therefrom. However, the present invention is not limited to this. For example, the apron brace 34 may be coupled to the rear part side of the outer side wall 28C of the gusset 28 with lower coupling strength than the front part side (the front end 34F0 side).

In this embodiment, the example in which the vehicle front structure 10 includes the bracket 20 and the apron brace 34 on both of the sides in the vehicle width direction is described. However, the present invention is not limited to this. For example, a configuration in which the bracket 20 and the apron brace 34 are provided only on the one side in the vehicle width direction may be adopted. In this case, on the other side that are not provided with the bracket 20 and the apron brace 34, for example, a component that is mounted in the vehicle may also serve as the bracket 20, or another structure for a measure against the small overlap collision may be adopted.

The embodiment of the present invention has been described so far. It is needless to say that the present invention is not limited to what has been described above, and various modifications other than the above can be made to carry out the present invention without departing from the gist thereof.

The invention claimed is:

1. A vehicle front structure comprising:
   a front side member extending along a vehicle front-rear direction;
   a bumper reinforcement extending along a vehicle width direction, the bumper reinforcement disposed forward in the vehicle front-rear direction with respect to the front side member;
   a gusset disposed on an outer side in the vehicle width direction with respect to the front side member, the gusset disposed rearward in the vehicle front-rear direction with respect to the bumper reinforcement, the gusset separated from the bumper reinforcement, wherein
   a front end of the gusset in the vehicle front-rear direction is arranged forward in the vehicle front-rear direction with respect to a front end of the front side member in the vehicle front-rear direction.

2. The vehicle front structure according to claim 1, wherein an inclined wall is formed in a rear part of the gusset in the vehicle front-rear direction, the inclined wall inclined toward an inner side in the vehicle width direction as the inclined wall extends rearward in the vehicle front-rear direction.

3. The vehicle front structure according to claim 1, wherein a bracket is coupled to the front end of the front side member in the vehicle front-rear direction, and the bracket is coupled to the front end of the gusset in the vehicle front-rear direction, the bracket includes a first coupling section, a second coupling section, and a step section, the first coupling section is coupled to the front end of the front side member in the vehicle front-rear direction, the second coupling section is arranged forward in the vehicle front-rear direction with respect to the first coupling section and the second coupling section is coupled to the front end of the gusset in the vehicle front-rear direction, and the step section connects the first coupling section and the second coupling section.

4. The vehicle front structure according to claim 1, wherein a connection member extends from an apron member, the apron member extending along the vehicle front-rear direction, the connection member disposed on the outer side in the vehicle width direction with respect to the front side member, a front end of the connection member in the vehicle front-rear direction is arranged rearward in the vehicle front-rear direction with respect to the front end of the gusset in the vehicle front-rear direction, and the front end of the connection member in the vehicle front-rear direction is coupled to a bracket.

5. The vehicle front structure according to claim 4, wherein the connection member is coupled to a front part side of the gusset in the vehicle front-rear direction, and the connection member can move relative to a rear part side of the gusset in the vehicle front-rear direction.

* * * * *